July 3, 1956
H. B. CRANE
2,752,683
BEAM COMPASS
Filed Oct. 16, 1952
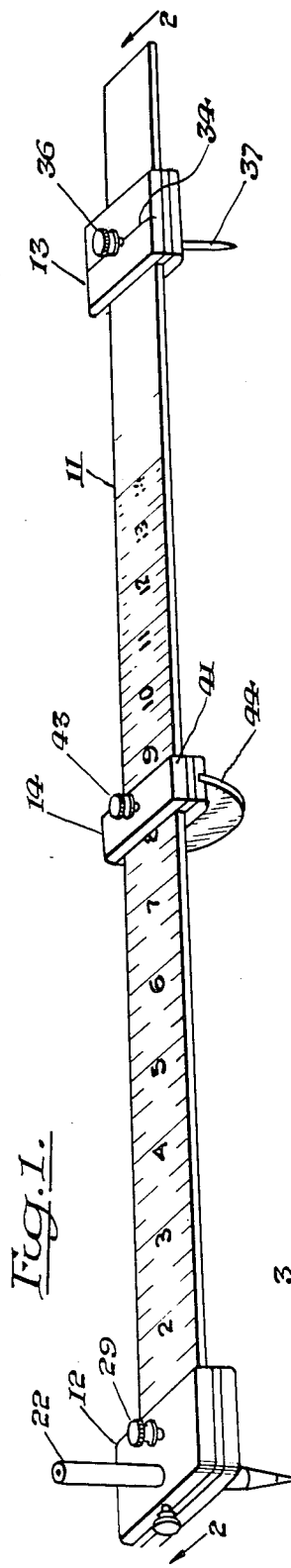
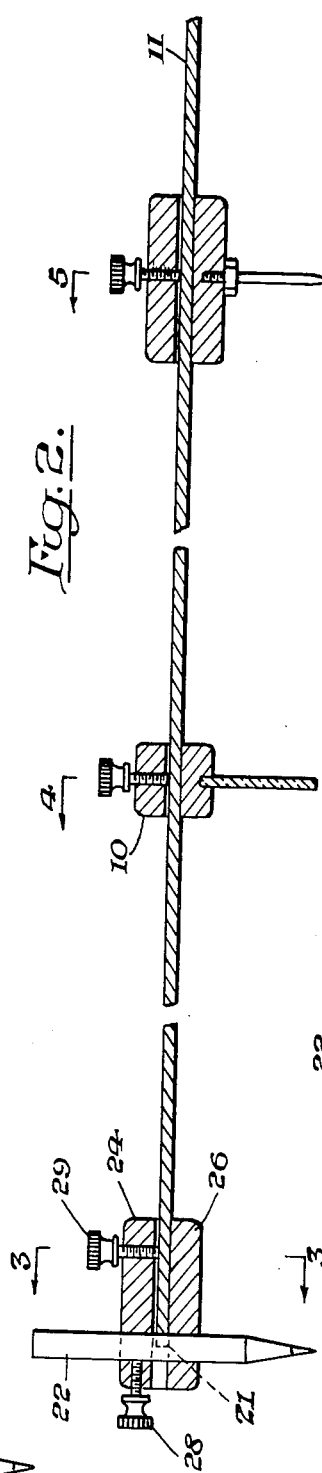
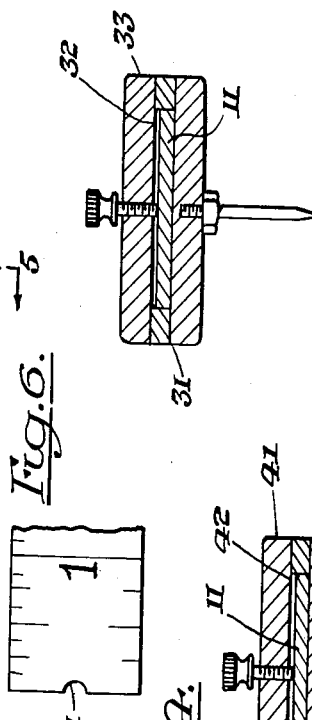
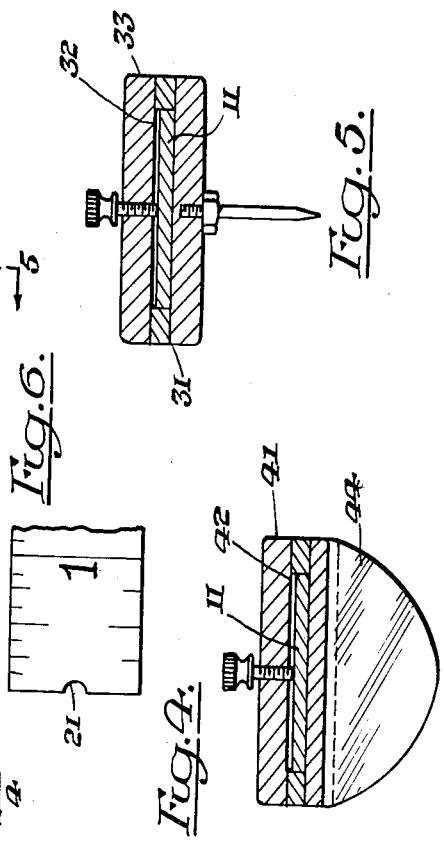
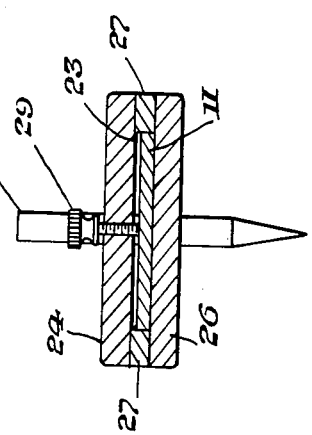
INVENTOR
*Howard B. Crane*
BY *Darby & Darby*
ATTORNEYS.

United States Patent Office 2,752,683
Patented July 3, 1956

2,752,683
BEAM COMPASS

Howard B. Crane, Mamaroneck, N. Y.

Application October 16, 1952, Serial No. 314,997

1 Claim. (Cl. 33—27)

The present invention relates to beam compasses and has for its particular object to provide a compass of this character that is very simple and inexpensive in construction, effective in operation, and that may be quickly and accurately adjusted.

It is a further object of the invention to provide in such a beam compass means for holding any usual type of pencil or pen in a manner to be readily removable for sharpening or replacement.

It is a further object of the invention to provide such a beam compass utilizing a rule of standard construction and stock form, in combination with special pencil-holding and pivot-holding elements of simple construction and use.

It is yet another object to provide a beam compass using a flat rule as the beam of the compass which is readily adjusted and utilized in its normal flat, horizontal position, and to provide simple and readily adjustable means to avoid inaccuracies or inconveniences of operation attributable to any flexure of the flat rule.

With these objects in view, the advantages and further objects of the invention will be readily apparent from consideration of the following description of the novel features of construction of the present invention taken in conjunction with the accompanying drawing in which:

Figure 1 shows a perspective assembled view of the beam compass of the present invention;

Figure 2 shows a longitudinal cross-sectional view of the compass of Figure 1;

Figure 3 shows a transverse cross-sectional view of the pencil or pen holder element of the compass arrangement;

Figure 4 shows a transverse cross-sectional view of the flexure-resisting support of the present arrangement;

Figure 5 shows a transverse cross-sectional view of the adjustable pivot element of the present arrangement, and Figure 6 shows a fragmentary plan view of the end of the rule of the present arrangement showing its accommodation for the pencil or pen holder.

Referring to the drawings, the beam compass of the present invention is formed by a flat planar rule 11 in combination with a flat substantially planar holder 12 for a marking device, a flat, substantially planar, adjustable pivot-supporting element 13, and an intermediate flexure-resisting element 14. The rule 11 is of conventional type having any desired length. According to the present invention rules of 12, 18, 24, 36 or 48 inches are equally adaptable to obtain the benefits of the invention and even large lengths may be used where desired. The rule 11 may be of standard construction such as formed by a metallic strip with engraved or superposed markings thereon. At the zero end of the rule, as indicated in Figure 6, a semi-circular notch 21 is formed along the central axis of the rule. The diameter of this notch 21 is made the same as the diameter of the marking device to be used such as a pen or pencil, so that the centrally located writing point of the marking device will be directly in line with the zero graduation of the rule, as is required for accurate indication of the radius of circles to be drawn.

As shown in Figures 1, 2 and 3, the marking device 22 is held in the marking device holder 12. This holder 12 is desirably formed of a member having a rectangular-shaped cross-section and a rectangular bore or channel 23 therethrough longitudinally from edge to edge, generally of the dimensions of the cross-section of the rule, so that the rule 11 may be slidably accommodated within that bore 23. The marking device holder 22 may be formed of a pair of flat plates 24, 26 cemented together with suitable spacers 27, with the horizontal separation between the spacers 27 substantially equal to the width of the rule 11 to be used and the thickness of the spacers 27 slightly greater than the thickness of the rule 11. Alternatively the entire marking device holder 12 may be molded integrally or machined from a single piece of suitable material. For the purpose of enhancing the appearance of the arrangement, the holder 12 may be formed of plastic material, wood, glass, metal, or the like, as desired.

Adjacent one edge the holder 12 has a bore or opening extending transversely thereof perpendicularly to channel 23 and along its longitudinal center line, which is of a size suitable to accommodate the marking device 22, which is retained in place by means of a thumb screw 28 or other similar locking or retaining device. Extending transversely through the upper portion 24 of the holder device 12 is a further thumb screw which, as shown in Figure 3, operates to retain the rule 11 in assembled position relative to the marking device 22. Thus, for assembly, the rule 11 is inserted within the rectangular bore 23 of the holder device 22 with the notch 21 juxtaposed to the marking device 22. The thumb screw 29 is then tightened to lock the rule 11 assembled with the holder device 12, which in turn retains the marking device 22 accurately positioned at the zero graduation of the rule 11.

The pivot-holding device 13 is shown in Figures 2 and 5. It is also formed by a rectangular block 31 of suitable material with a rectangular channel 32 running longitudinally from edge to edge and accommodating the rule 11. The block 31 may be formed in a manner similar to that of the marking device holder 12. However, preferably the upper face 33 of the block 31 is made transparent, and carries an index line 34 substantially centrally thereof and perpendicular to the rule-receiving channel 32. The upper portion 33 of the pivot holder 31 also contains a thumb screw or similar locking device 36 threaded therein which serves to clamp the pivot holder 13 to the rule 11 in any desired position. The lower portion of the pivot holder 13 carries the pointed pivot 37 preferably formed as a relatively short metallic rod having a sharp point at one end. The pivot 37 is suitably secured to the underside of the pivot holder 13, as by being molded therein or threaded therein or staked thereto, etc. It will be understood that the point of the pivot 37 should be vertically beneath the index line 34.

It will readily be seen that the pivot holder 13 can be readily slid along the rule 11 to any desired position. The graduations and markings of the rule 11 are clearly visible through the upper portion 33 of the pivot holder and the proper radius for the circle to be drawn is determined and indicated when the index line 34 coincides with the desired graduation of the rule 11.

According to one feature of the present invention, the rule 11 is placed in horizontal position, which has the distinct advantage of providing very simple readability of the graduations and simplified adjustment of the positions of the pivot point 37. Since such rules 11 are generally made of relatively flat or thin material and may, for example, be of the order of 1/16" in thickness, there is a tendency, especially with long spans, for the rule to sag between the pivot point and the point of the marking device. Such sagging can be prevented by the use of an intermediate support 14 which is formed by a flat, substantially planar body 41 having a rectangular channel 42 running longitudinally from edge to edge and accommodating the rule 11. A thumb screw 43 is provided for locking the support 14 to the rule in a fashion similar to the thumb screws 29 and 36. Secured to the body 41 is a spacer element 44 which may be formed as a smoothly curved flat member whose maximum distance from the adjoining edge of the bore 42 is substantially equal to, or very slightly less than, the distance from the point of the pivot 37 to the adjacent edge of the bore of the pivot holder 13. In this way, when the distance from the marking device point to the marker holder bore is of substantially this same value, the rule 14 will be held in a horizontal position for substantially all radii used. The spacer holder 10 can be readily adjusted to be at substantially the center point between the pivot 37 and the marker 22, or can be located adjacent the marker 22 so as to reduce the weight supported by the marker 22, the major portion of the weight of the compass being taken up by the spacer 14 in that case. The spacer 44 is smoothly curved so as to slide freely over the surface upon which the beam compass operates.

It will be understood that the above description of the preferred embodiment of my invention is intended to be illustrative only and that many modifications thereof may be readily devised without departing from the scope of the present invention which is defined solely by the following claim.

I claim as my invention:

A beam compass comprising a flat planar horizontally disposed rule member having graduations and indicia thereon, said rule member having a notch in the end thereof at the zero end of said indicia, a flat substantially planar marker holder slidably mounted at one end of said rule member, said marker holder having a channel longitudinally from edge to edge thereof to accommodate said rule member, said rule member extending within said channel, said marker holder having an opening running vertically therethrough from one planar surface to the other and perpendicularly to said channel and rule member to accommodate a marker positioned so that the side thereof extends into said notch, said holder having a first locking member extending inwardly from the edge thereof to said opening to lock adjustably said marker therein and a second locking member extending inwardly from one planar surface thereof to said channel to lock adjustably said holder onto said rule member, a flat substantially planar pivot holder slidably mounted on said rule member and slidable substantially the length thereof, said pivot holder having a channel running longitudinally from edge to edge thereof to accommodate said rule member, said rule member extending through said latter channel, a pointed pivot member mounted on and extending downwardly from one planar surface of said pivot holder, said pivot holder having a transparent upper planar surface with an indicia line running transversely therethrough, said line running in a direction normal to the longitudinal axis of said rule member and parallel to the indicia on said rule member, said pivot holder having a locking member extending inwardly from the surface thereof to said latter channel to lock adjustably said pivot holder on said rule member, a flat substantially planar spacer element holder slidably mounted on said rule member and slidable throughout substantially the length thereof, said spacer element holder having a channel running longitudinally from edge to edge thereof to accommodate said rule member, said rule member passing through said last-mentioned channel, said spacer element holder having a spacer element mounted on and extending downwardly from the lower planar surface thereof, said spacer element having a curved lower edge, said spacer element holder having a locking member extending inwardly from the planar surface thereof to said last-mentioned channel to lock adjustably said spacer element holder on said rule member.

References Cited in the file of this patent

UNITED STATES PATENTS

| | | |
|---|---|---|
| D. 102,387 | Moses | Dec. 15, 1936 |
| 1,195,887 | Wheeler | Aug. 22, 1916 |
| 1,572,237 | Hunt | Feb. 9, 1926 |
| 2,344,724 | Phillips | Mar. 21, 1944 |
| 2,419,752 | Zumbuhl | Apr. 29, 1947 |
| 2,499,673 | Olejniczak | Mar. 7, 1950 |

FOREIGN PATENTS

| | | |
|---|---|---|
| 604,777 | Germany | Oct. 27, 1934 |